United States Patent
Kurumasa et al.

(10) Patent No.: US 8,654,381 B2
(45) Date of Patent: Feb. 18, 2014

(54) IMAGE PROCESSING SYSTEM, SERVER DEVICE, IMAGE FORMING DEVICE, AND RECORDING MEDIUM WITH A COMPUTER PROGRAM RECORDED THEREON; WHEREIN AN IMAGE FORMING DEVICE ACQUIRES A MAXIMAL OPTIONAL CONFIGURATION THAT CAN BE IMPLEMENTED ON ANOTHER IMAGE FORMING DEVICE

(75) Inventors: Yoichi Kurumasa, Toyokawa (JP); Shoji Imaizumi, Shinshiro (JP); Hiroshi Sugiura, Toyokawa (JP); Kaoru Fukuoka, Toyokawa (JP); Yusaku Tanaka, Toyokawa (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 781 days.

(21) Appl. No.: 12/830,622

(22) Filed: Jul. 6, 2010

(65) Prior Publication Data

US 2011/0007351 A1 Jan. 13, 2011

(30) Foreign Application Priority Data

Jul. 9, 2009 (JP) ................................ 2009-162376

(51) Int. Cl.
*G06F 3/12* (2006.01)
(52) U.S. Cl.
USPC ............ 358/1.15; 358/1.14; 715/750; 710/62
(58) Field of Classification Search
USPC ................... 358/1.14, 1.15; 715/750; 710/62
See application file for complete search history.

(56) References Cited

U.S. PATENT DOCUMENTS

| | | | |
|---|---|---|---|
| 6,871,243 B2* | 3/2005 | Iwase et al. ................... | 710/62 |
| 2003/0063313 A1 | 4/2003 | Ito | |
| 2006/0159036 A1* | 7/2006 | Okada ........................ | 370/286 |
| 2007/0019229 A1* | 1/2007 | Matsuhara ................... | 358/1.15 |
| 2008/0088867 A1* | 4/2008 | Ikeda et al. .................. | 358/1.13 |
| 2009/0128844 A1* | 5/2009 | Kondo et al. ................ | 358/1.15 |
| 2009/0199109 A1* | 8/2009 | Doui .......................... | 715/750 |

FOREIGN PATENT DOCUMENTS

| | | |
|---|---|---|
| JP | 2003-208281 | 7/2003 |
| JP | 2007-055099 A | 3/2007 |

OTHER PUBLICATIONS

Office Action (Notification of Reasons for Refusal) dated Apr. 19, 2011, issued in the corresponding Japanese Patent Application No. 2009-162376, and an English Translation thereof.

* cited by examiner

*Primary Examiner* — Jacky X Zheng
(74) *Attorney, Agent, or Firm* — Buchanan Ingersoll & Rooney PC

(57) ABSTRACT

An image processing system in which an image forming device and a server device are connected via a network, the image forming device including an acquisition unit operable to acquire a maximum optional configuration that indicates all optional functions that can be implemented on another image forming device; a creation unit operable to create an external use screen, which is a customized screen for display on an operation panel of the other image forming device, in accordance with the maximum optional configuration; and a transmission unit operable to transmit external setting information corresponding to the external use screen to the server device, and the server device including a customized screen storage unit that stores the external setting information. With this structure, a customized screen for use on the other image forming device can be created to include functions not implemented on the image forming device.

21 Claims, 17 Drawing Sheets

FIG. 8

| Product name | Maximum optional configuration |
|---|---|
| C550 | Double-sided Punch Staple |
| C650 | Double-sided Punch Staple Finished stamp Pattern |
| C750 | Double-sided Punch Staple Finished stamp Pattern Connect to portable device |

FIG. 9A

| User name | Type of personal panel | Display items | Display language |
|---|---|---|---|
| User A | Regular use panel (MFP1) | (1) Copy (2) FAX/scan (3) Box (4) Image panel (5) Web browser (6) Finishing (7) Read settings | Japanese |
| | External use panel 1 (MFP2) | (1) Copy (2) FAX/scan (3) Box (4) Image panel (5) Web browser (6) Finishing (7) Read settings (8) Pattern | Chinese |
| | External use panel 2 (MFP3) | (1) Copy (2) Web browser (3) Finishing (4) Double-sided (5) Connect to portable device | English |
| User B | | | |

| Identification information | Character code | Icon | Coordinates |
|---|---|---|---|
| 001 | Copy |  | $(x_1, y_1)$ |
| 002 | FAX/scan |  | $(x_2, y_2)$ |
| 003 | Box |  | $(x_3, y_3)$ |

225

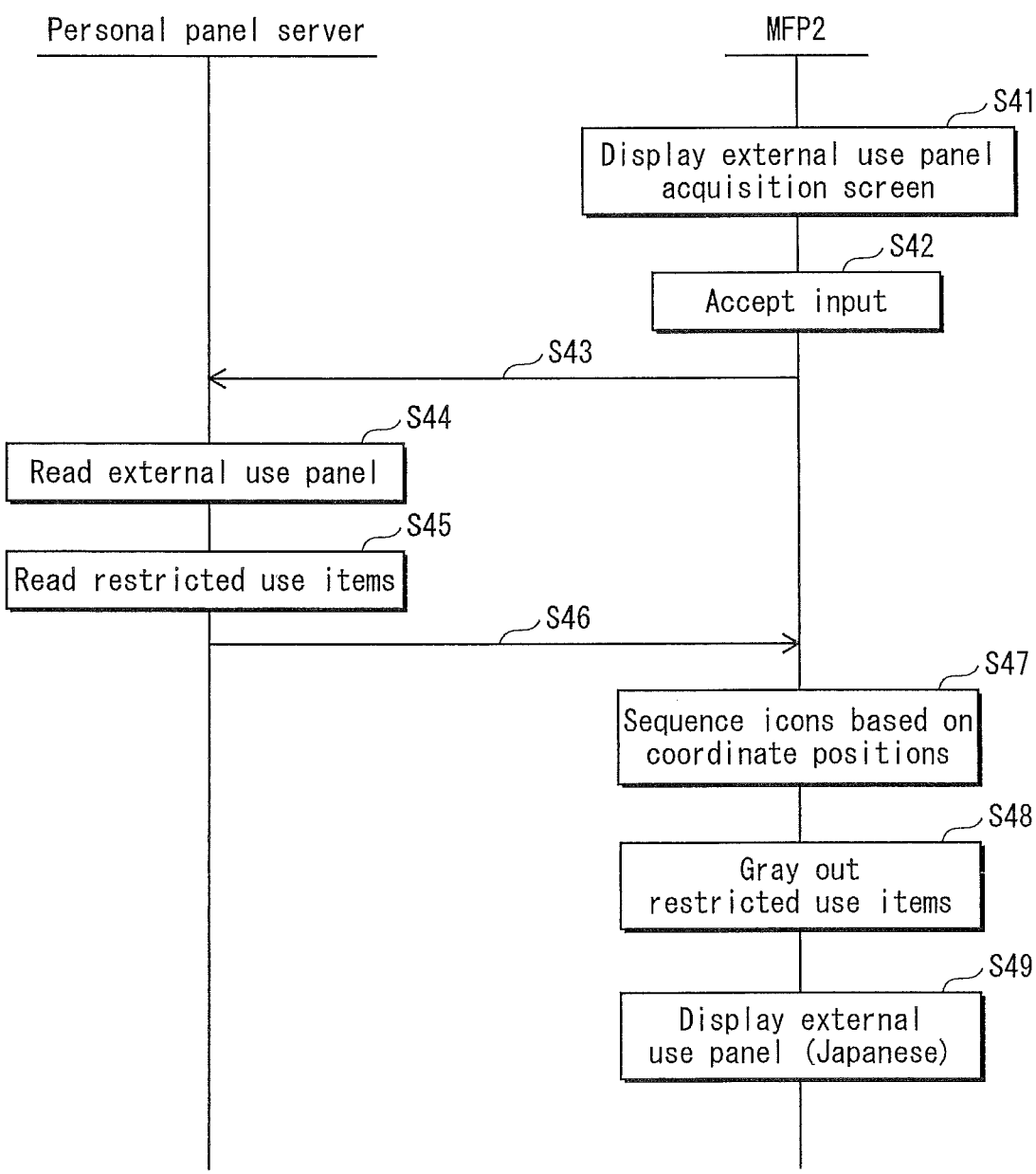

the creation unit to the server device, and the server device comprising: a customized screen storage unit that stores the external setting information transmitted by the image forming device.

IMAGE PROCESSING SYSTEM, SERVER DEVICE, IMAGE FORMING DEVICE, AND RECORDING MEDIUM WITH A COMPUTER PROGRAM RECORDED THEREON; WHEREIN AN IMAGE FORMING DEVICE ACQUIRES A MAXIMAL OPTIONAL CONFIGURATION THAT CAN BE IMPLEMENTED ON ANOTHER IMAGE FORMING DEVICE

This application is based on an application No. 2009-162376 filed in Japan, the content of which is hereby incorporated by reference.

BACKGROUND OF THE INVENTION (1) Field of the Invention

The present invention relates to technology for customizing screens displayed on an operation panel of an image forming device and particularly relates to technology to generate a customized screen for use on a different image forming device than the image forming device that a user regularly uses.

(2) Description of the Related Art

In recent years, it has become possible to customize, for each user, the screens displayed on an operation panel of an image forming device. For example, a user can select frequently used functions and arrange corresponding shortcut keys to create a personal panel exclusively for the user.

By storing setting information for personal panels on a server and having a Multi-Function Peripheral (MFP) acquire setting information for personal panels from the server, it is also possible for an MFP to display a personal panel for each user on the initial screen of the MFP's operation panel.

Prior Citation: Japanese Patent Application Publication 2007-55099

On the part of users, there is a desire to create ahead of time, on the MFP users regularly use, a personal panel to be displayed on an MFP at a business travel destination.

The shortcut keys displayed on a personal panel can only be selected from within the range of functions implemented on an MFP. Therefore, if the MFP at the business travel destination is a different product than the regularly used MFP and has different optional functions, a user cannot create ahead of time a personal panel that thoroughly takes advantage of those functions.

SUMMARY OF THE INVENTION

It is an object of the present invention to solve the above problem by providing an image processing system, server device, image forming device, and recording medium with a computer program recorded thereon that allow for creation, on a first device, of a personal panel for use on a different device, the personal panel including functions not implemented on the first device.

In order to achieve the above object, the present invention is an image processing system in which an image forming device and a server device are connected via a network, the image forming device comprising: an acquisition unit operable to acquire a maximum optional configuration that indicates all optional functions that can be implemented on another image forming device; a creation unit operable to create an external use screen in accordance with the maximum optional configuration acquired by the acquisition unit, the external use screen being a customized screen for display on an operation panel of the other image forming device; and a transmission unit operable transmit external setting information corresponding to the external use screen created by

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 8 shows the data configuration of an optional configuration table 210 stored in the personal panel server 20;

FIG. 9A shows the data configuration of a personal panel table 220 stored in the personal panel server 20, and FIG. 9B shows the data configuration of an item table 225 stored in the personal panel server 20;

FIG. 17 is a flowchart showing operations to use an external use panel according to embodiment 2.

DESCRIPTION OF THE PREFERRED EMBODIMENT

Embodiment 1

With reference to the drawings, the following describes an image processing system 1 as embodiment 1 of the present invention.

<Structure>

The following describes the structure of the image processing system 1.

Figure 1:
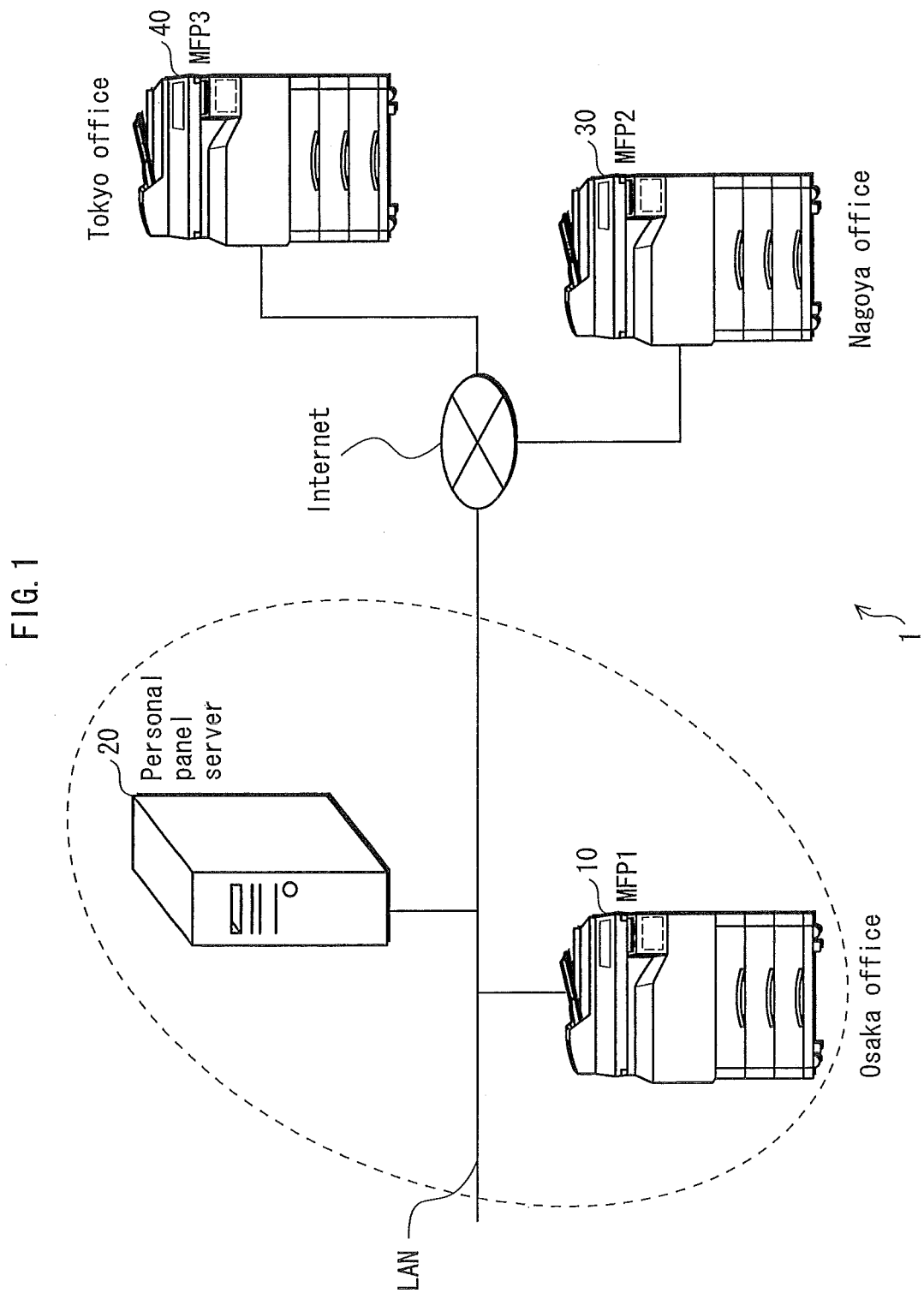
FIG. 1 shows the system configuration of the image processing system 1.

FIG. 1 shows the overall system configuration of the image processing system 1.

As shown in FIG. 1, the image processing system 1 is composed of an image forming device that is a multi-function peripheral (MFP), i.e. MFP1(10); a personal panel server 20; an MFP2(30); and an MFP3(40).

The MFP1(10) and personal panel server 20 are pieces of equipment installed in the Osaka office, MFP2(30) is a piece of equipment installed in the Nagoya office, and MFP3(40) is a piece of equipment installed in the Tokyo office.

MFP1(10), MFP2(30), and MFP3(40) are multi-function peripherals that are provided with a copier function, printer function, FAX function, etc.

The personal panel server 20 is a server device that manages personal panels created on the MFP1(10).

The image processing system 1 is a system through which a user (i) creates, on the MFP the user regularly uses, a personal panel for use as a customized screen on an MFP at a business travel destination and (ii) uses the created personal panel on the MFP at the business travel destination.

In embodiment 1, the personal panel on the MFP that a user regularly uses is referred to as a""regular use panel (regular use screen)", and a personal panel on another MFP is referred to as an "external use panel (external use screen)".

Furthermore, the personal panels in embodiment 1 can be created for each user. In other words, user A can create personal panels (regular use panel and external use panels) exclusively for personal use, and user B can also create personal panels (regular use panel and external use panels) exclusively for personal use.

Embodiment 1 describes a concrete example in which user A, who based at the Osaka office, creates an external use panel on the MFP1(10), which user A regularly uses at the Osaka office, and uses the external use panel on another image forming device, i.e. the MFP2(30) installed at the Nagoya office to which user A travels on business.

1. Structure of MFP1(10)

Figure 2:
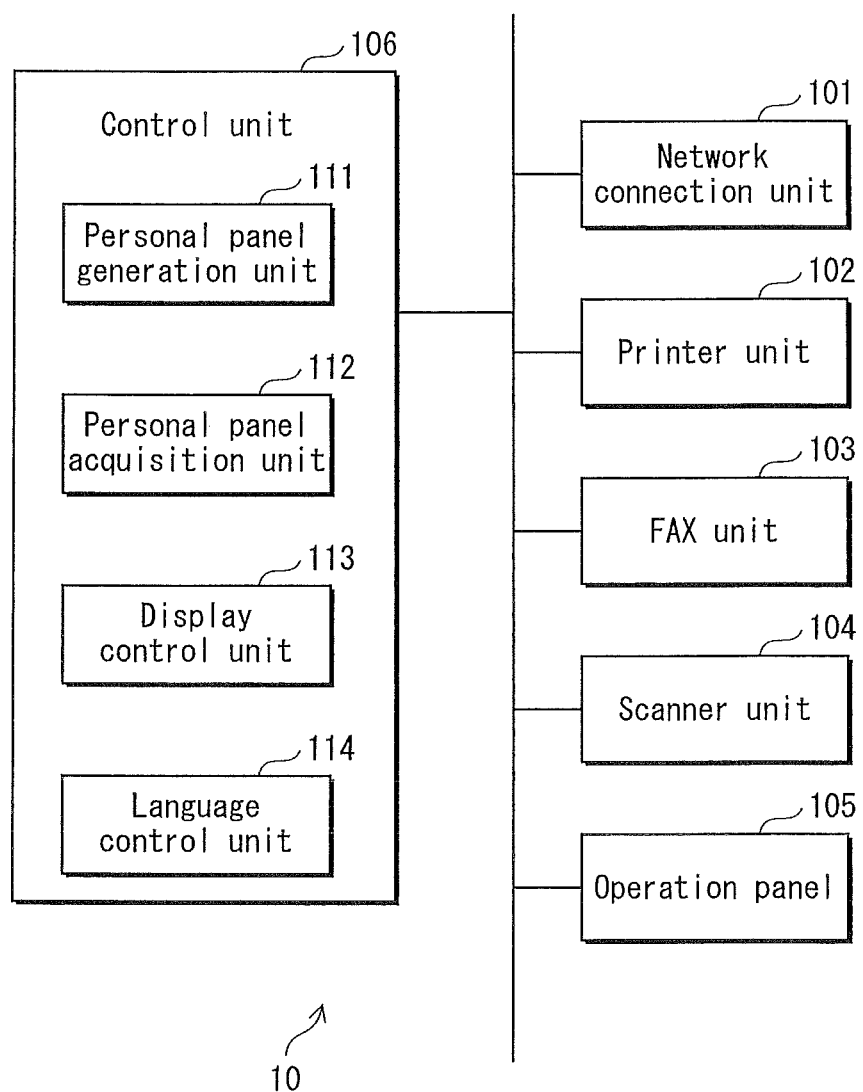
FIG. 2 is a block diagram showing the configuration of an MFP1(10)

FIG. 2 is a block diagram showing the configuration of the MFP1(10).

As shown in FIG. 2, the MFP1(10) is composed of a network connection unit 101, printer unit 102, FAX unit 103, scanner unit 104, operation panel 105, and control unit 106.

The network connection unit 101 is provided with a port for connecting the MFP1(10) to a network. Via the network, the MFP1(10) transmits and receives information to and from the personal panel server 20, MFP2(30), and MFP3(40).

Upon accepting a print job from the control unit 106, the printer unit 102 outputs a paper document by printing, on paper, data that has been converted for printing.

The FAX unit 103 functions as a modem for transmitting and receiving FAX data via a public line.

When the control unit 106 accepts a scanning process, the scanner unit 104 reads images such as characters, figures, photographs, etc. from a paper document and generates image data composed of electronic data. Note that the scanner unit 104 may be provided with an ADF that automatically reads multiple paper documents or a device that has a duplex function for double-sided scanning.

The printer unit 102, FAX unit 103, and scanner unit 104 are provided with memory for storing data that is input or received.

Figure 3:
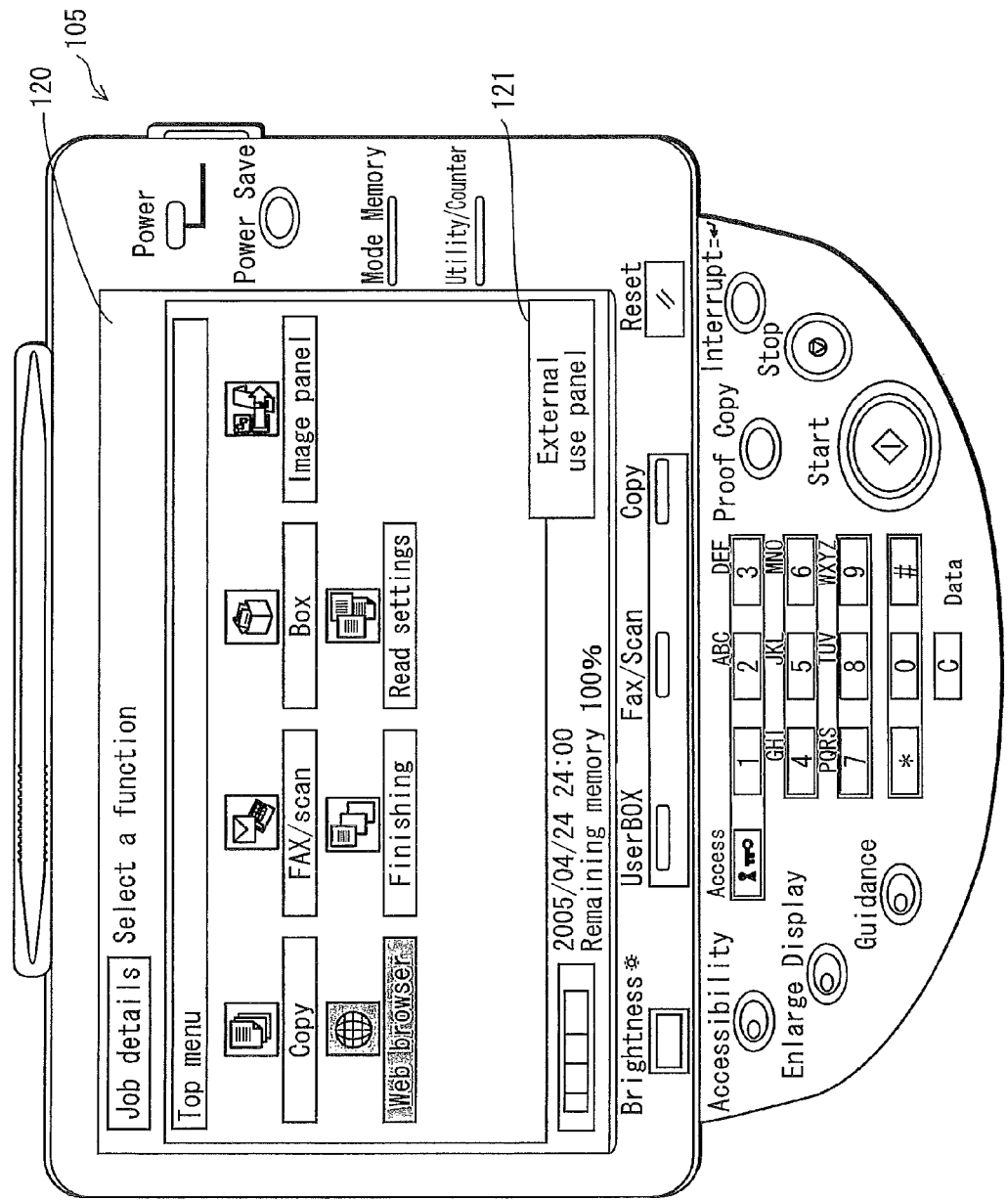
FIG. 3 shows a regular use panel 120 displayed on the operation panel 105.

As shown in FIG. 3, the operation panel 105 is provided with a touch-panel LCD and with a variety of keys such as a numeric keypad, a start key, a stop key, etc. Instead of an LCD, an organic EL display may be used.

The operation panel 105 acts as a dedicated control device by which the user operates the MFP1(10). The touch panel LCD displays a variety of screens output by the control unit 106. By operating the operation panel 105, the user can input instructions into the MFP1(10) for a print job, a FAX job, creation of a new personal panel, etc.

FIG. 3 shows a regular use panel 120 as displayed on the LCD of the operation panel 105. The regular use panel 120 has already been created by user A, and the personal panel server 20 administers setting information for the regular use panel 120.

As shown in FIG. 3, seven shortcut icons (operation keys) are sequenced on the regular use panel 120: copy, FAX/scan, box, image panel, Web browser, finishing, and read settings. The shortcut icons are composed of an icon image and a character sequence indicating the function corresponding to the icon image. Also, the regular use panel 120 includes a transition key 121. The information for configuring such a panel (screen) is listed in the setting information.

When user A presses one of the icons or the transition key 121 on the regular use panel 120, the operation panel 105 determines the coordinates of the pressed location and notifies the control unit 106 of the coordinates. Upon accepting the coordinates of the pressed location from the operation panel 105, the control unit 106, which is described below, controls the units so as to perform the function corresponding to the coordinates.

When user A selects the transition key 121, the display on the LCD transitions to the external use panel creation screen.

On the other hand, when the transition key 121 on the regular use panel 120 is selected after creation of an external use panel, the display on the LCD transitions to the created external use panel.

Note that when the transition key 121 is selected after creation of an external use panel, a screen may be displayed to have a user select whether to transition to a new external use panel creation screen or to an existing external use panel.

Also, when multiple external use panels have been created, a screen may be displayed to have a user select the external use panel to which the display should transition.

The control unit 106 is composed of a CPU, ROM, RAM, HDD, etc. A variety of computer programs to cause the MFP1(10) to function are recorded on the HDD or ROM: an overall control program, image processing program, network control program, personal panel creation program, etc.

Via the CPU using the working RAM to execute the variety of computer programs, the control unit 106 controls other units, thereby controlling the functions and operations of the MFP1(10) as a whole.

The control unit 106 includes a personal panel generation unit 111, personal panel acquisition unit 112, display control unit 113, and language control unit 114.

(Creation of Regular Use Panel 120)

The personal panel generation unit 111 creates a regular use panel 120 by accepting, from a user, functions for which to create shortcut icons from among the functions implemented on the MFP1(10). It is thought that user A will select frequently used functions. When selecting functions, the user may be allowed to select, according to preference, the icon image representing a function from among multiple icon images.

As described in detail below, the MFP1(10) has a multi-language display function. The multi-language display function is a function for a user to select, from among multiple languages, the display language for the screens displayed on the operation panel 105.

In embodiment 1, as an example of the method for setting the display language of the regular use panel 120, the personal panel generation unit 111 accepts a display language setting for the regular use panel 120 from a user when creating the regular use panel 120.

The personal panel generation unit 111 sequences the shortcut icons for the functions selected by the user and displays a confirmation screen on the operation panel 105 to confirm registration.

If the user confirms registration, the personal panel generation unit 111 transmits the user name, identification information on the selected functions, character code and icon image for the selected functions, coordinate positions for the shortcut icons, and display language to the personal panel server 20 via the network connection unit 101.

(Creation of External Use Panel)

If user A selects the transition key 121 while the regular use panel 120 is being displayed on the operation panel 105, the external use panel creation screen is displayed.

When creating an external use panel for use on the MFP2 (30), the user A inputs the product name of the MFP2(30) on the external use panel creation screen. After the product name is input, the personal panel generation unit 111 acquires, from the personal panel server 20, the maximum optional configuration (information indicating all of the optional functions that can be implemented on a model) for the model corresponding to the input product name. In embodiment 1, user A is assumed to know the product name of the MFP2(30).

Next, the personal panel generation unit 111 displays, on the operation panel 105, a screen for selecting items to set 130 that includes standard functions common to each MFP as well as the optional functions included in the maximum optional configuration for the MFP2(30) acquired from the personal panel server 20.

Figure 4:
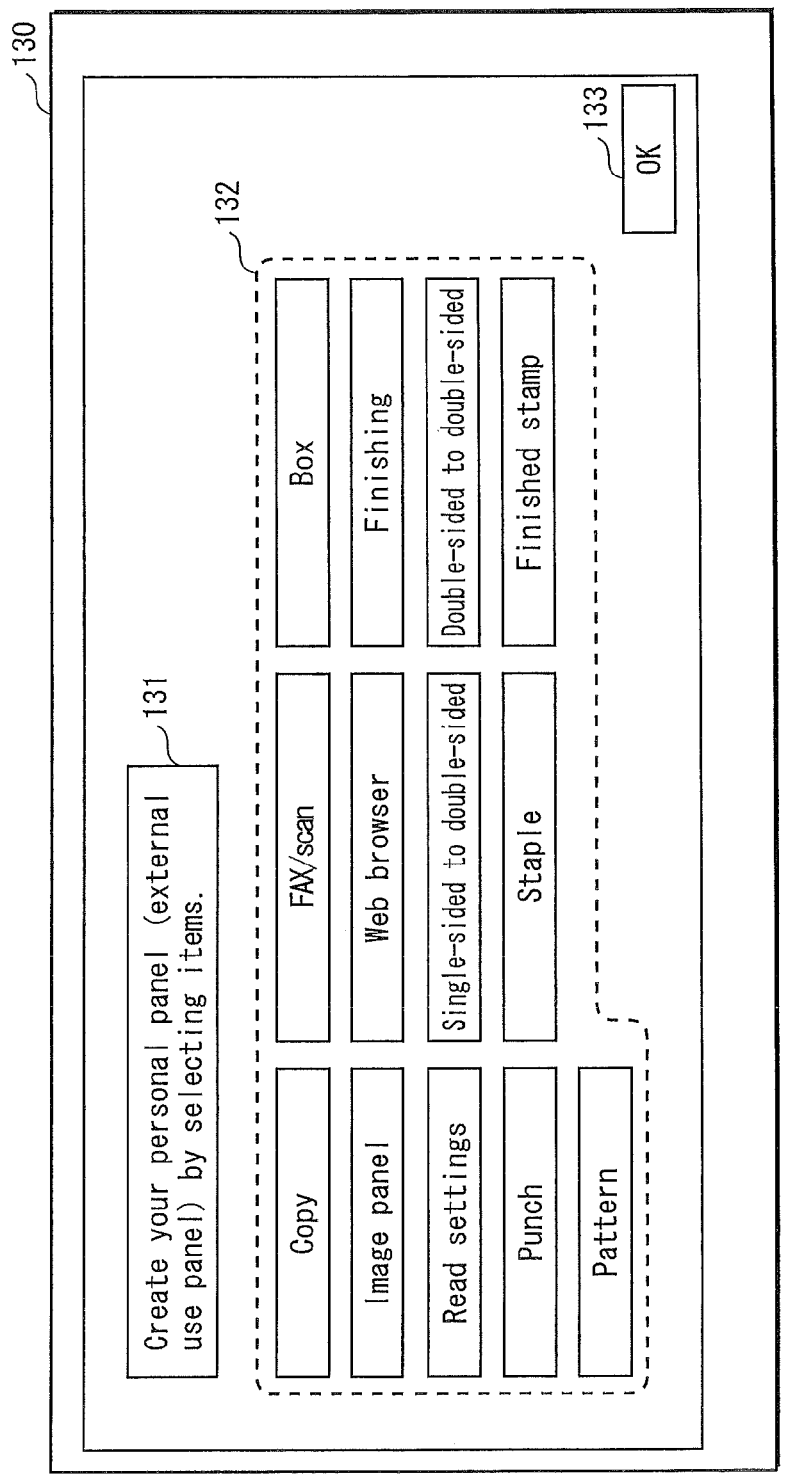
FIG. 4 shows a screen for selecting items to set 130 displayed on the operation panel 105 when creating an external use panel.

FIG. 4 shows a screen for selecting items to set 130. The screen for selecting items to set 130 includes a message 131, item group 132 formed by a plurality of items, and an OK key 133. The message 131 reads, "Create your personal panel (external use panel) by selecting items".

Among the item group 132, the standard functions common to each MFP are: copy, FAX/scan, box, image panel, Web browser, finishing, and read settings.

Among the item group 132, the optional functions that can be implemented on the MFP2(30) are single-sided to double-sided, double-sided to double-sided, punch, staple, finished stamp, and pattern. Among these optional functions, the pattern function cannot be implemented on the MFP1(10).

After accepting, from user A, one or more items among the item group 132 for which to create shortcut icons, the personal panel generation unit 111 creates the external use panel by registering selection of the OK key 133. It is thought that user A will select frequently used functions or functions that user A wants to use on the MFP2(30) at the business travel destination.

Figure 5:
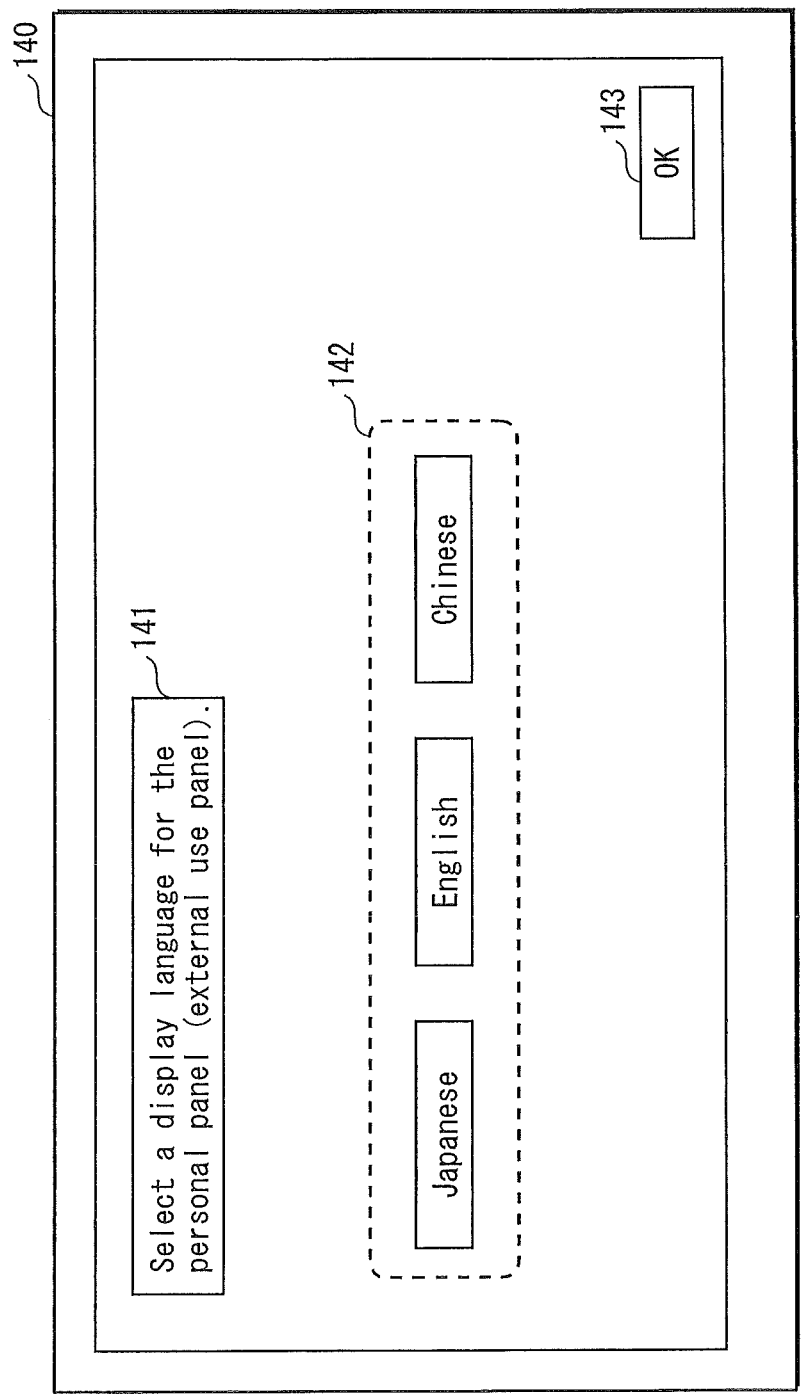
FIG. 5 shows a display language selection screen 140 displayed on the operation panel 105 when creating an external use panel.

Also, the personal panel generation unit 111 displays the display language selection screen 140 shown in FIG. 5 on the operation panel 105. The display language selection screen 140 includes a message 141, a language group 142 formed by Japanese, English, and Chinese, and an OK key 143. The message 141 reads, "Select a display language for the personal panel (external use panel)".

The personal panel generation unit 111 accepts selection by user A of one of the languages in the language group 142 and subsequently, by accepting selection of the OK key 143, sets the display language of the external use panel.

The personal panel generation unit 111 sequences the shortcut icons for the functions selected by the user and displays a confirmation screen on the operation panel 105 to confirm registration.

If the user confirms registration, the personal panel generation unit 111 transmits the user name, identification information on the selected functions, character code and icon image for the selected functions, coordinate positions for the shortcut icons, and display language to the personal panel server 20 via the network connection unit 101.

Figure 6:
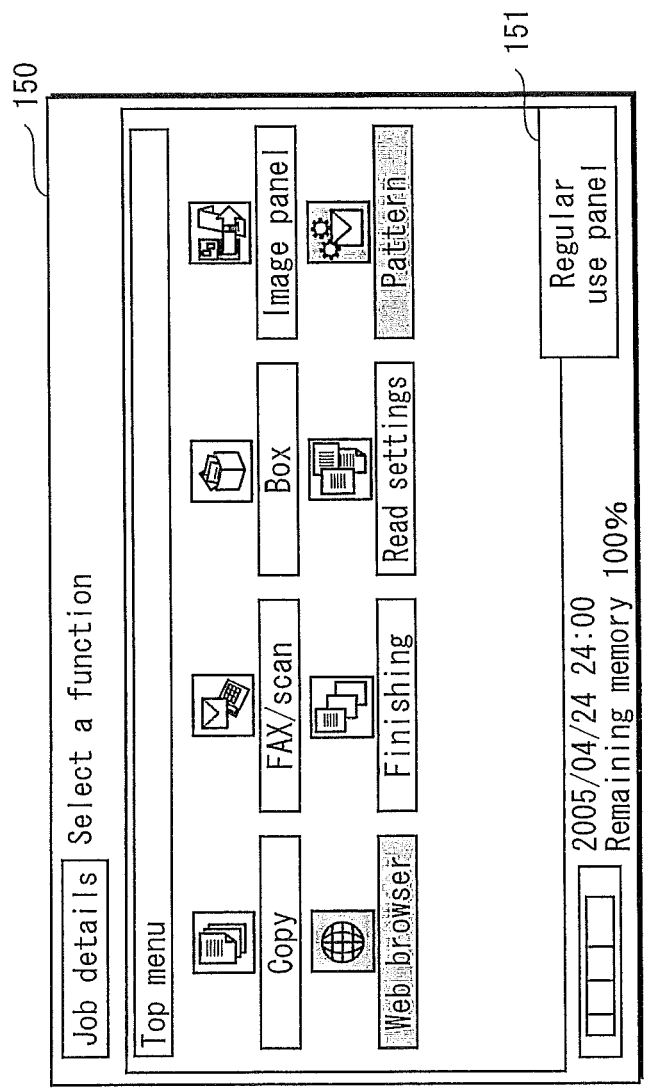
FIG. 6 shows an external use panel 150 displayed on the operation panel 105 of the MFP1(10)

FIG. 6 shows an external use panel 150 displayed on the operation panel 105 of the MFP1(10).

As compared with the regular use panel 120 (see FIG. 3), the external use panel 150 includes a shortcut icon for a function not implemented on the MFP1(10), "pattern". Also, the external use panel 150 includes a transition key 151. When user A selects the transition key 151, the screen on the LCD transitions to the regular use panel 120.

(Display Control)

The display control unit 113 generates a variety of screens displayed on the LCD of the operation panel 105. In this embodiment, the regular use panel 120 and external use panel 150 are described as concrete examples of the variety of screens.

Upon accepting a request to display the regular use panel 120 from user A via the operation panel 105, the personal panel acquisition unit 112 acquires setting information on the regular use panel 120 and setting information on the external use panel from the personal panel server 20. By accepting input from user A of the user name, user ID, and user password and sending the user name to the personal panel server 20, the display control unit 113 acquires setting information corresponding to the user name.

In the image processing system 1, the administrator can set restricted functions for each user. Also, the personal panel server 20 stores restricted functions for each user.

When acquiring setting information for the regular use panel 120 from the personal panel server 20, the personal panel acquisition unit 112 acquires restricted use items as restricted use information. The restricted use items indicate the functions that user A cannot use.

The personal panel acquisition unit 112 transmits the setting information and restricted use items acquired from the personal panel server 20 to the display control unit 113.

Based on the setting information for the regular use panel, the display control unit 113 sequences the shortcut icons to generate the regular use panel 120. Furthermore, based on the restricted use items, the display control unit 113 determines whether there are any functions among the shortcut icons sequenced on the regular use panel 120 whose use is restricted for user A. The display control unit 113 grays out shortcut icons corresponding to any functions whose use is restricted.

The display control unit 113 outputs the regular use panel 120 that has been grayed out to the LCD of the operation panel 105. Even if user A presses the shortcut icons that have been grayed out on the operation panel 105, the user input is discarded, thereby prohibiting user A from selecting such functions.

The Web browser shortcut icon is grayed out on the regular use panel 120 shown in FIG. 3. Accordingly, user A is restricted from using the Web browser function. User A cannot select the shortcut icon for the Web browser.

Display of the external use panel 150 on the operation panel 105 is the same as the regular use panel 120, yet in the case of the external use panel 150, the display control unit 113 also grays out, among the shortcut icons sequenced on the external use panel 150, the shortcut icons corresponding to functions not implemented on the MFP1(10).

In the external use panel 150 shown in FIG. 6, the Web browser shortcut icon and the pattern shortcut icon are grayed out. User A is restricted from using the Web browser function. On the other hand, the pattern function is implemented on the MFP2(30) but not on the MFP1(10).

Note that the reason the external use panel 150 for use on the MFP2(30) is displayed on the operation panel 105 of the MFP1(10) is not for user A to use the external use panel 150 on the MFP1(10), but rather for user A to verify and/or change the created external use panel.

(Transmitting the External Use Panel)

The network connection unit 101 receives an external use panel transmission request from the MFP2(30). The external use panel transmission request includes user A's user name, user ID, and user password.

A login function unit (not shown in the drawings) in the control unit 106 authenticates the user ID and user password received from the MFP2(30). When authentication succeeds, use of the MFP1(10) is allowed. When authentication fails, use of the MFP1(10) is prohibited. An error message may be returned from the MFP1(10) to the MFP2(30) when authentication fails.

In other words, user A logs in to MFP1(10) from MFP2(30) via remote operation.

The personal panel acquisition unit 112 transmits the user name (user A) and identification information on the peripheral (MFP1) to the personal panel server 20 and acquires the setting information for the external use panel and the restricted use items for user A.

The personal panel acquisition unit 112 determines whether the display language of the external use panel acquired from the personal panel server 20 is Japanese, English, or Chinese.

If the display language is set to Japanese, the personal panel acquisition unit 112 transmits the setting information and restricted use items acquired from the personal panel server 20 to the MFP2(30) via the network connection unit 101.

If the display language is set to English or Chinese, the personal panel acquisition unit 112 transmits the acquired setting information and restricted use items to the display control unit 113.

The display control unit 113 sequences the shortcut icons included in the setting information in the same way as when generating the regular use panel 120. Then, via the multi-language display function in the language control unit 114, the display control unit 113 converts the message (including the character sequences included in the shortcut icons) included in the external use panel into English or Chinese. Subsequently, the display control unit 113 grays out the restricted use items among the shortcut icons included in the external use panel, thus generating screen information. The display control unit 113 then transmits the generated screen information to the MFP2(30) via the network connection unit 101.

(Multi-Language Display Function)

As described above, the MFP1(10) has a multi-language display function. The multi-language display function is a function for displaying a variety of screens on the operation panel 105 in a user's preferred language from among multiple languages. Specifically, the MFP1(10) stores language data in English and Chinese and can display the variety of screens in English and Chinese in addition to Japanese.

When the MFP1(10) boots up, a conversion program for Japanese to English and a conversion program for Japanese to Chinese boot up in the language control unit 114, and the English language data and Chinese language data stored in FlashROM are loaded into RAM.

In its initial state, the screens displayed on the operation panel 105 of the MFP1(10) are entirely in Japanese. If, for example, the user presses the "English" or "Chinese" keys displayed on the operation panel 105, the language control unit 114 converts the messages on the screen to English or Chinese in accordance with the pressed key.

The display language of the external use panel for user A is set to "Chinese". In this case, upon acquiring the external use panel on which shortcut icons have been sequenced from the display control unit 113, the language control unit 114 converts all of the messages included in the external use panel to Chinese and returns the converted external use panel to the display control unit 113.

2. Configuration of the Personal Panel Server 20

The personal panel server 20 is a server device for managing the personal panels created on the MFP1(10). The personal panel server 20 can only be accessed from the Osaka office, and forbids access from peripherals in other offices. Accordingly, the MFP1(10) in the Osaka office can acquire a variety of information from the personal panel server 20, but the MFP2(30) in the Nagoya office and the MFP3(40) in the Tokyo office cannot acquire information directly from the personal panel server 20. This configuration is to ensure security in the Osaka office. A configuration wherein the personal panel server 20 is only actually connected via a network to the MFP1(10) and not to the MFP2(30) or MFP3(40) is also possible.

Figure 7:
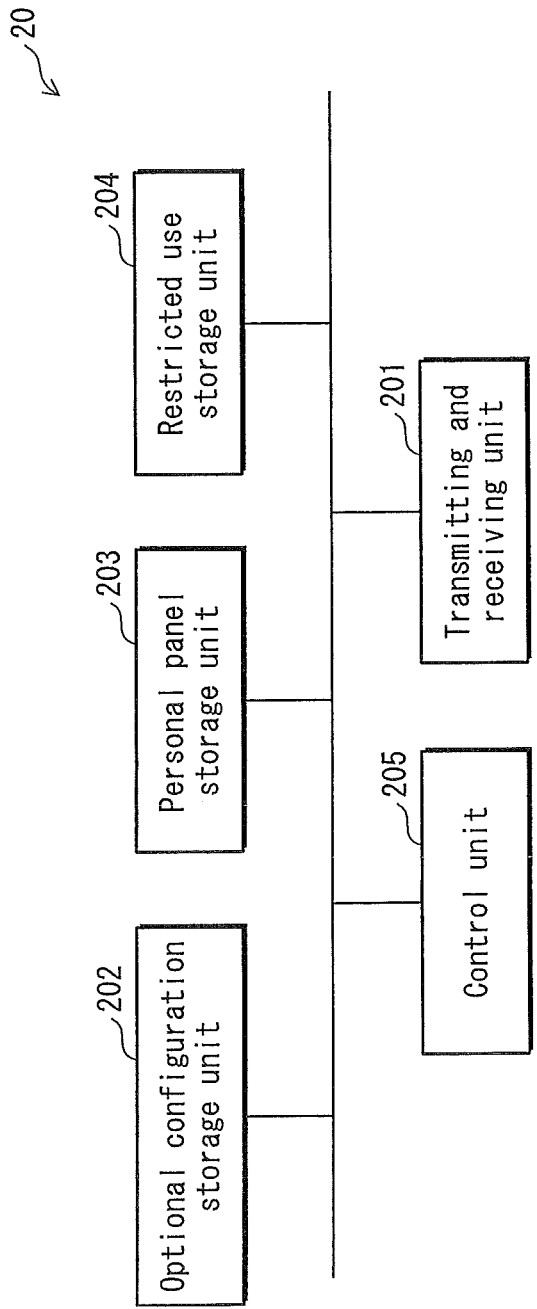
FIG. 7 is a block diagram showing the configuration of the personal panel server 20.

FIG. 7 is a block diagram showing the configuration of the personal panel server 20 by function.

As shown in FIG. 7, the personal panel server 20 is composed of a transmitting and receiving unit 201, optional configuration storage unit 202, personal panel storage unit 203, restricted use storage unit 204 and control unit 205.

The transmitting and receiving unit 201 is a network connection unit. Via the network, the personal panel server 20 transmits information to and receives information from the MFP1(10).

The optional configuration storage unit 202 is composed of flash memory or the like and stores the optional configuration table 210 shown in FIG. 8. The optional configuration table 210 is a table that associates the product name of the MFP with the maximum optional configuration for the MFP. In embodiment 1, the "maximum optional configuration" refers to all of the optional functions that can be implemented on the MFP.

For example, in an MFP with a product name "C550", the following optional functions can be implemented: two-sided, punch, and staple. An MFP with a product name "C650" is a superior model to "C550", and in addition to two-sided, punch, and staple, the following optional functions can be implemented: finished stamp and pattern.

The maximum optional configuration of the MFP is transmitted to the MFP1(10) and is used when the MFP1(10) creates personal panels used on other MFPs such as MFP2(30) or MFP3(40)

The personal panel storage unit 203 is composed of flash memory or the like and stores personal panel information created on the MFP1(10) for each user. Specifically, the personal panel storage unit 203 stores the personal panel table 220 and item table 225 shown in FIGS. 9A and 9B.

The personal panel table 220 includes a plurality of pieces of personal panel information. Each piece of personal panel information includes a user name, personal panel classification, display items, and display language.

For example, the regular use panel for user A includes the following as display items: 1. copy, 2. FAX/scan, 3. box, 4. image panel, 5. Web browser, 6. finishing, and 7. read settings. The display language is "Japanese".

The regular use panel 1 for user A includes the following as display items: 1. copy, 2. FAX/scan, 3. box, 4. image panel, 5.

Web browser, 6. finishing, 7. read settings, and 8. pattern. The display language is "Chinese".

The regular use panel 2 for user A includes the following as display items: 1. copy, 2. Web browser, 3. finishing, 4. double-sided, and 5. connect to portable device. The display language is "English".

As shown in FIG. 9A, an external use panel can be created for each MFP. Therefore, when multiple MFPs exist within the system, the user can create multiple external use panels. Accordingly, in FIG. 9A, the external use panel that user A created for use on the MFP2(30) is listed as "external use panel 1", and the external use panel that user A created for use on the MFP3(40) is listed as "external use panel 2" in order to distinguish between the panels.

The item table 225 in FIG. 9B shows details on the display items included in the personal panel information in FIG. 9A.

For example, the display item "copy" included in each piece of personal panel information specifically indicates identification information "001", a character code showing "copy", the icon data shown in FIG. 9B, and the coordinates $(x_1, y_1)$ when displaying the shortcut icon on the personal panel.

In the case that the user can freely select icons images, item information differs for each user, and thus personal panel information and item information have to be in one-to-one correspondence for each user.

Personal panel information and item information are transmitted to the MFP1(10) and are used for displaying personal panels on the MFP1(10) and on other MFPs. Note that personal panel information and item information is also called "setting information".

Figure 10:
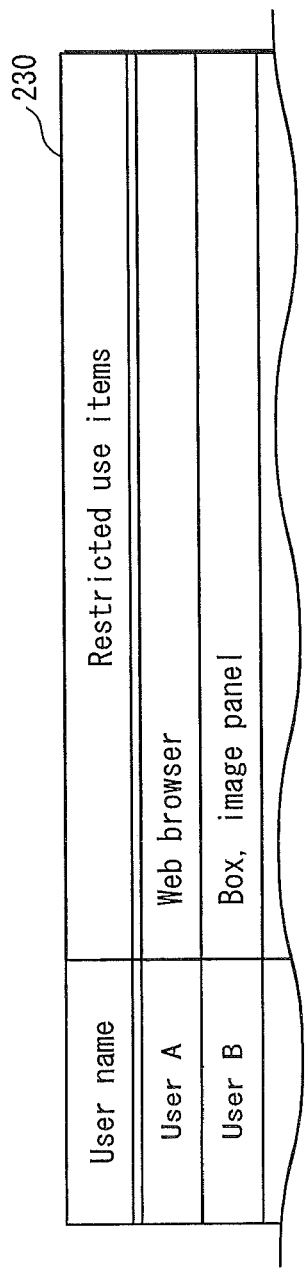
FIG. 10 shows the data configuration of a restricted use table 230 stored in the personal panel server 20.

The restricted use storage unit 204 is composed of flash memory or the like and stores the restricted use table 230 shown in FIG. 10.

As described above, in the image processing system 1, the system administrator can set restricted functions for each user. This information is administered in the restricted use table 230 in the personal panel server 20.

As shown in FIG. 10, the restricted use table 230 includes multiple pieces of restricted use information. Each piece of restricted use information includes a user name and restricted use items, which indicate the functions that the user cannot use. For example, user A cannot use the "Web browser" function.

Access to write to the restricted use table 230 is restricted, and only the administrator can write to (update) the restricted use table 230.

The restricted use items are transmitted to the MFP1(10) at the same time as setting information for personal panels and is used to control display of personal panels.

The control unit 205 is composed of a CPU, ROM, RAM, HDD, etc. A variety of computer programs to cause the personal panel server 20 to function are stored on the HDD or ROM.

Via the CPU using the working RAM to execute the variety of computer programs, the control unit 205 controls the functions and operations of the personal panel server 20 as a whole.

Specifically, the control unit 205 controls writing of information to each storage unit and reading of information from each storage unit.

More specifically, when receiving from the MFP1(10) an indication of a product name and a transmission request for the maximum optional configuration, the control unit 205 reads the maximum optional configuration corresponding to the product name from the optional configuration storage unit 202 and transmits the maximum optional configuration to the MFP1(10).

Upon receiving a request for transmission of a personal panel from an MFP, the control unit 205 authenticates the requesting MFP. In embodiment 1, only the peripheral installed in the Osaka office is allowed to acquire personal panels stored in the personal panel server 20. Accordingly, it suffices for this authentication to confirm that the requesting MFP is the MFP1(10). When authentication succeeds, the control unit 205 reads setting information indicating the regular use panel and/or external use panels from the personal panel storage unit 203 and transmits this setting information to the MFP1(10).

Upon acquiring from the MFP1(10) setting information that indicates the created regular use panel, the control unit 205 associates the regular use panel with the user name, personal panel classification, display items, and display language, registering the resulting information in the personal panel table 220 in the personal panel storage unit 203. Also, if among the display items included in the acquired setting information there are display items not registered in the item table 225, the control unit 205 creates item information corresponding to such display items and registers the display items in the item table 225.

Upon acquiring from the MFP1(10) setting information that indicates an external use panel, the control unit 205 associates the external use panel with the regular use panel having the same user name. The control unit 205 then registers the personal panel classification, display items, and display language in the personal panel table 220. Also, if among the display items included in the acquired setting information there are display items not registered in the item table 225, the control unit 205 creates item information corresponding to such display items and registers the display items in the item table 225.

Upon receiving a request to write in the restricted use table 230, the control unit 205 authenticates whether the requester is the administrator. Specifically, authentication is performed using the administrator ID, administrator password, etc. The control unit 205 allows writing to the restricted use table 230 only when the requester is the administrator.

When a new product is added to the image processing system 1, the control unit 205 acquires the maximum optional configuration for the product, adding this information to the optional configuration table 210.

3. Configuration of MFP2 (30)

The MFP2(30) is a peripheral installed in the Nagoya office. User A uses the MFP2(30) when traveling to the Nagoya office on business.

Figure 11:
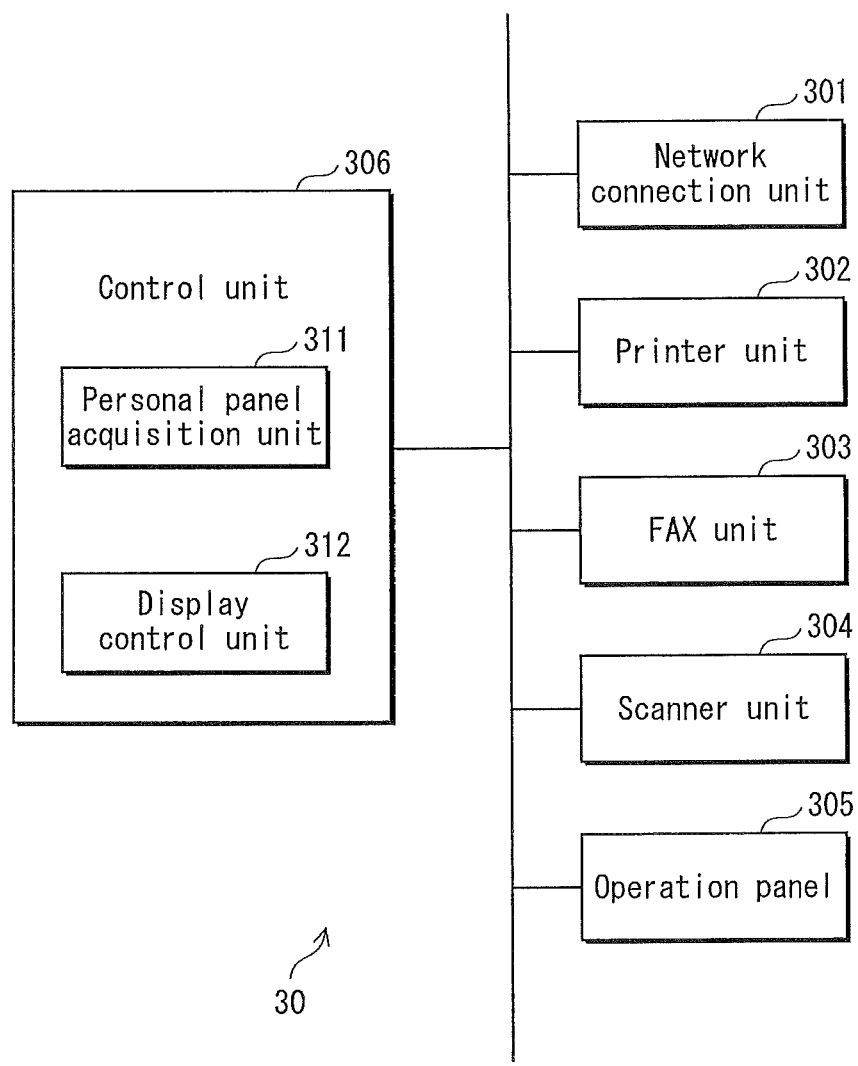
FIG. 11 shows the configuration of an MFP2(30)

FIG. 11 shows the configuration of the MFP2(30).

As shown in FIG. 11, the MFP2(30) is composed of a network connection unit 301, printer unit 302, FAX unit 303, scanner unit 304, operation panel 305, and control unit 306.

The network connection unit 301, printer unit 302, FAX unit 303, scanner unit 304, and operation panel 305 have the same configuration and function as the corresponding components in the MFP1(10) described above, and thus a description thereof is omitted.

The control unit 306 includes a personal panel acquisition unit 311 and a display control unit 312.

(Acquisition of External Use Panel)

Upon accepting a request for acquisition of the external use panel from user A via the operation panel 305, the personal panel acquisition unit 311 outputs a screen for inputting the user name, user ID and user password to the LCD of the operation panel 305. The personal panel acquisition unit 311 then accepts input of the user name, user ID, and user password.

Figure 12:
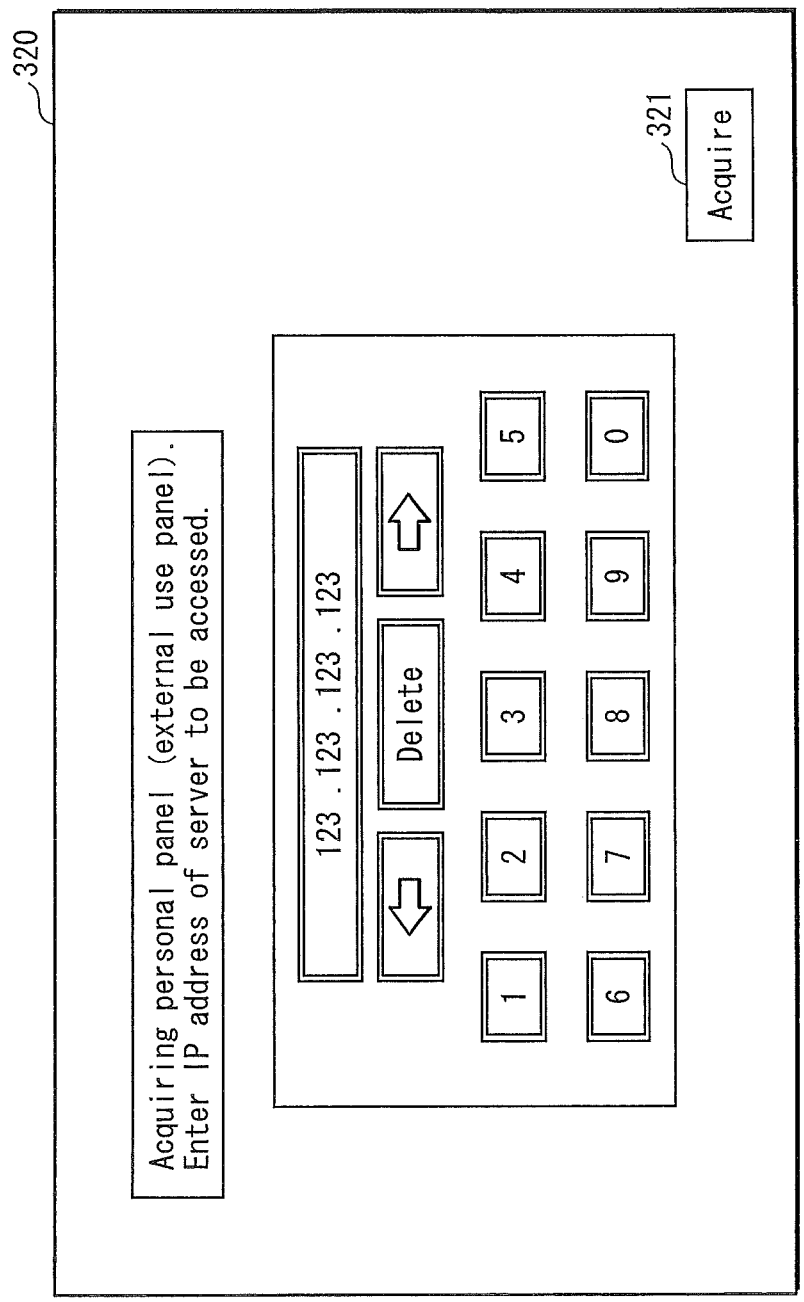
FIG. 12 shows an external use panel acquisition screen 320 displayed on the operation panel 305 when acquiring the external use panel.

Also, the personal panel acquisition unit 311 outputs the external use panel acquisition screen 320 shown in FIG. 12 to the LCD of the operation panel 305.

User A can submit a request for transmission of the external use panel to the MFP1(10) by inputting the IP address of the MFP1(10) into the external use panel acquisition screen 320.

Upon acquiring the IP address input by user A from the operation panel 305, the personal panel acquisition unit 311 transmits an external use panel transmission request, which includes the user name, user ID, and user password, to the IP address via the network connection unit 301.

When user A succeeds in logging into MFP1(10) via remote operation, the personal panel acquisition unit 311 receives screen information for the external use panel from the MFP1(10). The personal panel acquisition unit 311 transmits the acquired screen information to the display control unit 312.

User A has set the display language of the external use panel for use on the MFP2(30) to Chinese. Accordingly, based on the setting information for the external use panel acquired from the personal panel server 20, the MFP1(10) uses the Chinese conversion function installed on the MFP1(10) to generate screen information that displays the external use panel in Chinese and transmits the generated screen information to the MFP2(30).

When the display language for the external use panel is set to Japanese, the personal panel acquisition unit 311 receives setting information indicating the external use panel for user A and restricted use items for user A from the MFP1(10), transmitting the received setting information and restricted use items to the display control unit 312.

The MFP2(30) thus has a remote access function to acquire setting information corresponding to the external use panel from the MFP1(10).

(Display of External Use Panel)

Upon receiving screen information from the personal panel acquisition unit 311, the display control unit 312 determines whether there are functions not implemented on the MFP2(30) based on the coordinate positions of the shortcut icons included in the received screen information.

If functions not implemented on the MFP2(30) are included in the screen information, the display control unit 312 outputs shortcut icons indicating such functions to the LCD on the operation panel 305 after graying out the shortcut icons.

Upon receiving setting information and restricted use items from the personal panel acquisition unit 311, the display control unit 312 refers to the setting information to sequence the shortcut icons. Also, the display control unit 312 grays out shortcut icons for the functions indicated by the restricted use items.

Furthermore, if there are any shortcut icons among the sequenced shortcut icons indicating functions not implemented on the MFP2(30), the display control unit 312 grays out such shortcut icons and thus generates the external use panel.

The display control unit 312 outputs the generated external use panel to the LCD of the operation panel 305.

Figure 13:
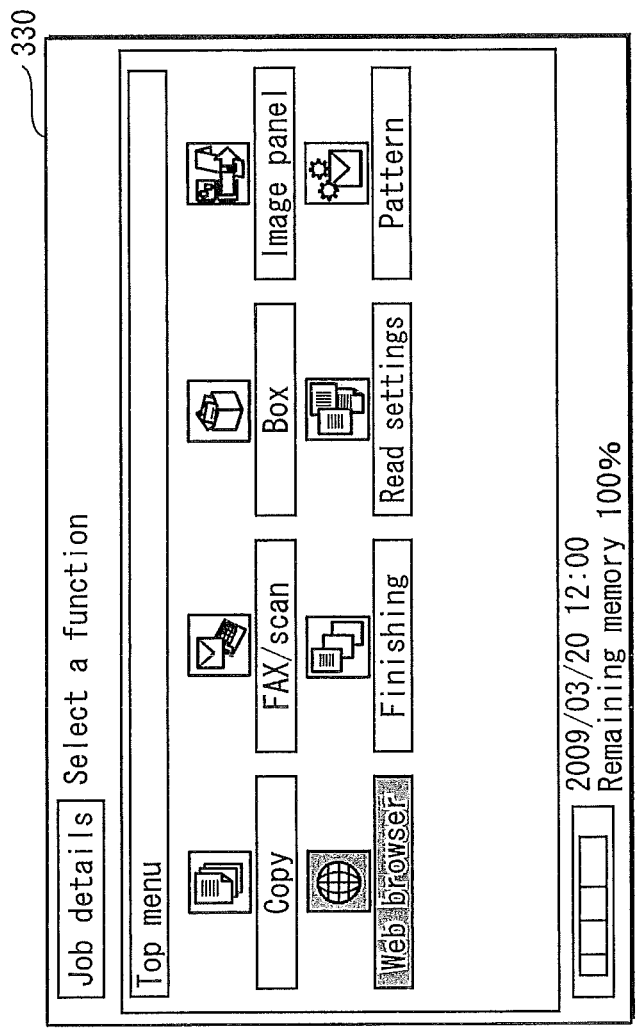
FIG. 13 shows an external use panel 330 displayed on the operation panel 305.

FIG. 13 shows an external use panel 330 displayed on the operation panel 305. As shown in FIG. 13, the shortcut icon for the Web browser is grayed out on the external use panel 330, and thus user A cannot use the Web browser function on the MFP2(30).

<Operation>

The operations of the image processing system 1 are now described.

(Generation of External Use Panel)

Figure 14:
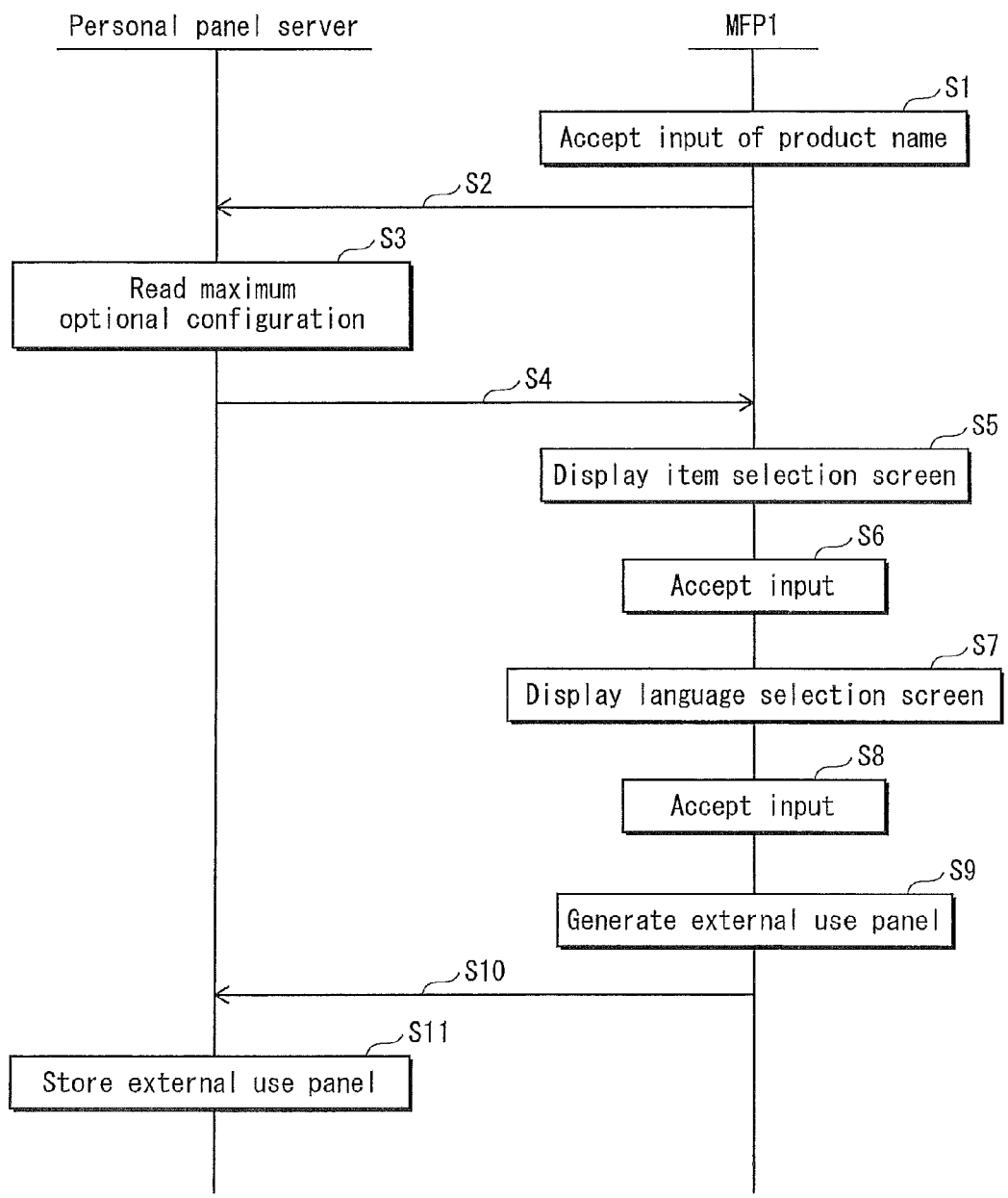
FIG. 14 is a flowchart showing operations to generate an external use panel.

First, processing by which the MFP1(10) generates an external use panel for use on the MFP2(30) is described with reference to the flowchart in FIG. 14.

The operation panel 105 in the MFP1(10) accepts input of the product name of the MFP2(30) from user A (step S1). The personal panel generation unit 111 in the MFP1(10) transmits the product name of the MFP2(30) to the personal panel server 20 via the network connection unit 101, and the transmitting and receiving unit 201 in the personal panel server 20 receives the product name (step S2).

Next, the control unit 205 in the personal panel server 20 reads, from the optional configuration storage unit 202, the maximum optional configuration corresponding to the product name received in step S2 (step S3). The control unit 205 transmits the read maximum optional configuration to the MFP1(10) via the transmitting and receiving unit 201, and the network connection unit 101 in the MFP1(10) receives the maximum optional configuration from the MFP2(30) (step S4).

The personal panel generation unit 111 generates a screen for selecting items to set (see FIG. 4) from the received maximum optional configuration for the MFP2(30) and from the standard functions common to each MFP and displays the generated screen for selecting items to set on the operation panel 105 (step S5). Via the operation panel 105, the personal panel generation unit 111 accepts, from the user, input of items for which the user desires to create shortcut icons on the external use panel (step S6).

Next, the personal panel generation unit 111 displays a display language selection screen (see FIG. 5) on the operation panel 105 (step S7). Via the operation panel 105, the personal panel generation unit 111 accepts, from user A, selection of a display language (step S8).

The personal panel generation unit 111 then generates an external use panel on which the shortcut icons selected by user A are sequenced (step S9).

Upon accepting, from user A, confirmation of registration of the generated external use panel, the personal panel generation unit 111 transmits setting information for generating the external use panel to the personal panel server 20 (the setting information including user name, identification information on the selected functions, character code and icon image for selected functions, coordinate positions for the shortcut icons, and display language), and the transmitting and receiving unit 201 in the personal panel server 20 receives the setting information (step S10).

Based on the received setting information, the control unit 205 in the personal panel server 20 associates the external use panel with a regular use panel for user A and stores the external use panel in the personal panel table 220 in the personal panel storage unit 203, adding the necessary item information to the item table 225 (step S11).

(Display of the External Use Panel)

Figure 15:
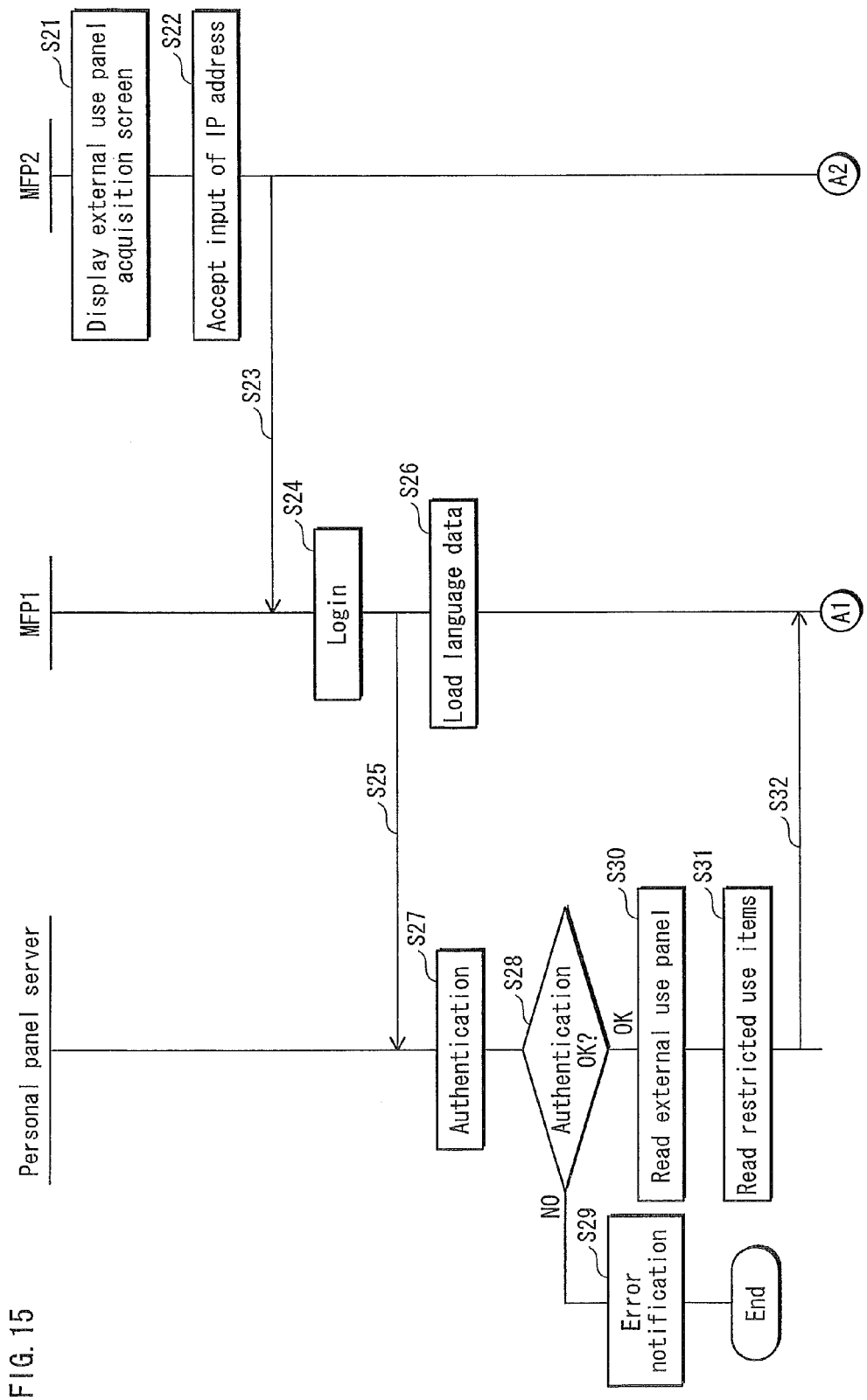
FIG. 15 is a flowchart showing operations to use an external use panel and is continued in FIG. 16.
Figure 16:
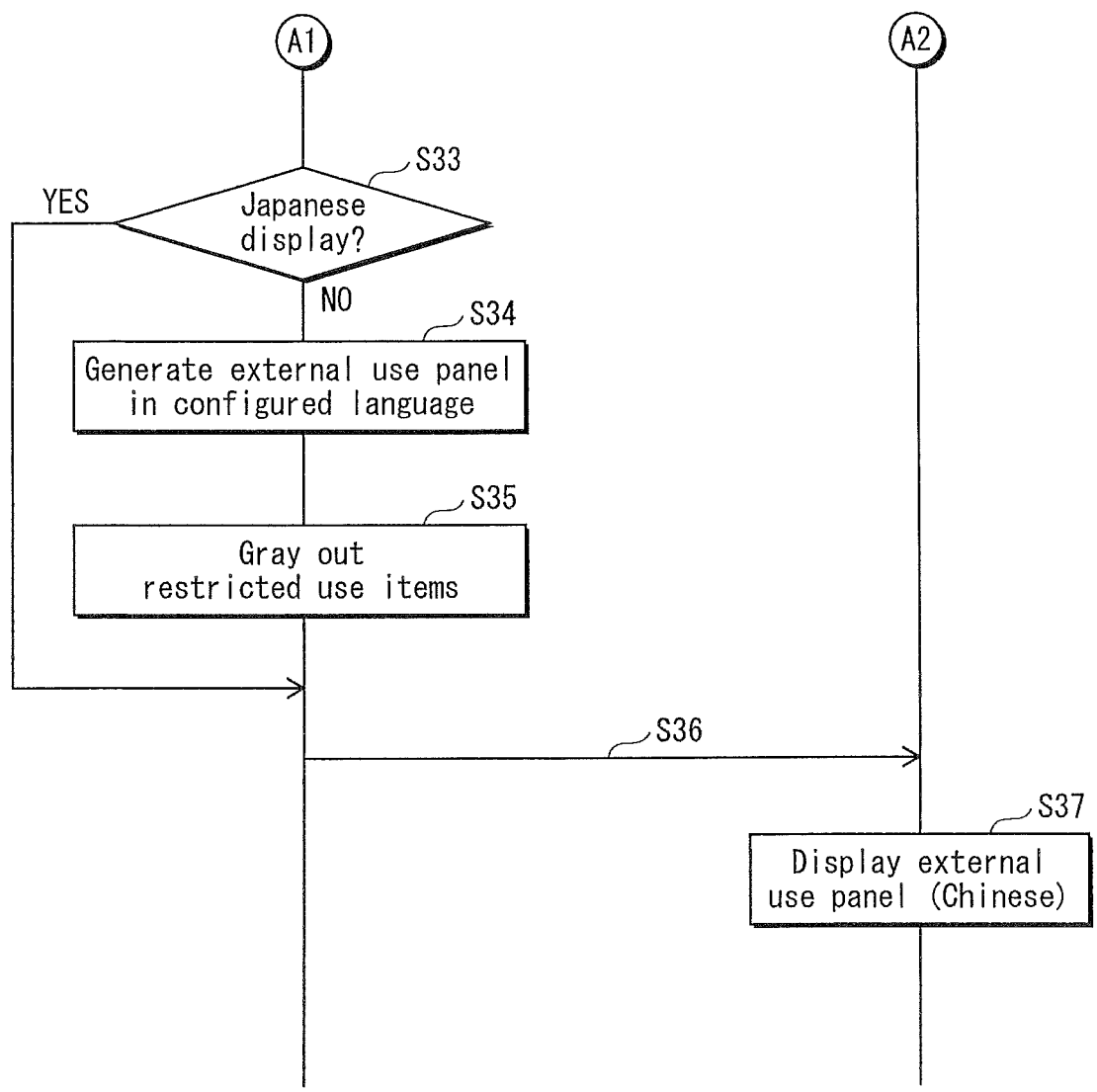
FIG. 16 is a flowchart showing operations to use an external use panel and is a continuation of FIG. 15.

Next, processing to display the external use panel on the MFP2(30) is described with reference to the flowcharts in FIG. 15 and FIG. 16.

Upon receiving an acquisition request for the external use panel from user A via the operation panel 305, the personal panel acquisition unit 311 in the MFP2(30) outputs a screen for inputting the user name, user ID, and user password on the LCD of the operation panel 305. The personal panel acquisition unit 311 then accepts input of the user name, user ID, and user password.

Also, the personal panel acquisition unit 311 displays an external use panel acquisition screen 320 (see FIG. 12) on the LCD of the operation panel 305 (step S21) and accepts input of the IP address of the MFP1(10) (step S22).

The personal panel acquisition unit 311 transmits an external use panel transmission request that includes the user name, user ID, and user password to the accepted IP address, and the network connection unit 101 in the MFP1(10) receives the external use panel transmission request (step S23).

The control unit 106 receives the external use panel transmission request from the network connection unit 101 and authenticates the user ID and user password. When authentication of the user ID and user password fails, the control unit 106 may return an indication of failure to the MFP2(30).

The control unit 106 only allows user A to log in when authentication of the user ID and user password succeeds (step S24). Once login is allowed, the personal panel acquisition unit 112 submits a request for the external use panel for user A to the personal-panel server 20 (step S25).

When multiple external use panels for user A are registered on the personal panel server 20, the personal panel acquisition unit 112 requests the external use panel 1 used on the MFP2 (30) from the personal panel server 20.

Also, after the login in step S24, the language control unit 114 in the MFP1(10) performs processing to load the English and Chinese language data stored on flash ROM into RAM (step S26).

Upon receiving a transmission request for a personal panel, the control unit 205 in the personal panel server 20 authenticates the requesting MFP (step S27). In this case, the control unit 205 authenticates whether the requesting MFP is the same peripheral in the Osaka office by referring to the IP address, MAC address, other identification information, etc.

When authentication fails (step S28: NO), the control unit 205 notifies the requesting MFP of an error (step S29). When authentication succeeds (step S28: OK), the control unit 205 reads setting information for the external use panel 1 for user A from the personal panel storage unit 203 (step S30). Next, the control unit 205 reads restricted use items for user A from the restricted use storage unit 204 (step S31).

The control unit 205 transmits the read setting information and restricted use information to the MFP1(10) via the transmitting and receiving unit 201, and the network connection unit 101 in the MFP1(10) receives the setting information and the restricted use information (step S32).

Upon receiving the setting information and the restricted use information, the personal panel acquisition unit 112 determines the display language of the external use panel. If the display language is set to Japanese (step S33: YES), the personal panel acquisition unit 112 transmits the setting information and the restricted use information acquired from the personal panel server 20 to the MFP2(30) via the network connection unit 101 (step S36).

If the display language is set to English or Chinese (step S33: NO), the language control unit 114 generates an English or a Chinese external use panel (step S34). Subsequently, the display control unit 113 grays out the shortcut icons for the restricted use items (step S35) and generates screen information.

The personal panel acquisition unit 112 transmits the generated screen information to the MFP2(30) via the network connection unit 101 (step S36).

Upon receiving screen information, the display control unit 312 in the MFP2(30) grays out shortcut icons corresponding to functions not implemented on the MFP2(30) and generates the external use panel. The display control unit 312 displays the generated external use panel on the LCD of the operation panel 305 (step S37).

When receiving setting information and restricted use information, the display control unit 312 in the MFP2(30) sequences shortcut icons based on the setting information. The display control unit 312 also grays out shortcut icons as necessary, thus generating the external use panel. The display control unit 312 displays the generated external use panel on the LCD of the operation panel 305.

Embodiment 2

The following describes embodiment 2 of the present invention.

In embodiment 1, access to the personal panel server 20 is limited to the MFP1(10) installed in the Osaka office. Accordingly, the MFP2(30) in the Nagoya office acquires the external use panel from the personal panel server 20 via the MFP1 (10) by remotely accessing the MFP1(10).

Embodiment 2, on the other hand, describes the case where the MFP2(30) can directly access the personal panel server 20. Accordingly, the MFP1(10) according to embodiment 2 does not transmit the external use panel. Instead, the MFP2 (30) directly accesses the personal panel server and acquires the external use panel.

In the following, a description is provided for processing to display the external use panel on the MFP2(30) with reference to the flowchart in FIG. 17. Other processing is the same as in embodiment 1.

Upon receiving an acquisition request for an external use panel from user A via the operation panel 305, the personal panel acquisition unit 311 in the MFP2(30) outputs a screen for inputting the user name to the LCD of the operation panel 305. The personal panel acquisition unit 311 then accepts input of the user name from user A.

Also, the personal panel acquisition unit 311 displays the external use panel acquisition screen 320 (see FIG. 12) on the LCD of the operation panel 305 (step S41) and accepts input of the IP address of the personal panel server 20 (step S42).

The personal panel acquisition unit 311 transmits an external use panel transmission request, which includes the user name, to the accepted IP address, and the transmitting and receiving unit 201 in the personal panel server 20 receives the external use panel transmission request (step S43).

The control unit 205 in the personal panel server 20 reads setting information for the external use panel 1 for user A from the personal panel storage unit 203 (step S44). Next, the control unit 205 reads restricted use items for user A from the restricted use storage unit 204 (step S45).

The control unit 205 transmits the read setting information and restricted use items to the MFP2(30) via the transmitting and receiving unit 201, and the network connection unit 301 in the MFP2(30) receives the setting information and restricted use items (step S46).

Based on the coordinate positions included in the received setting information, the display control unit 312 in the MFP2 (30) sequences the shortcut icons (step S47). Also, the display control unit 312 grays out shortcut icons corresponding to the restricted use items (step S48). The display control unit 312 simultaneously grays out shortcut icons indicating features not implemented on the MFP2(30).

The display control unit 312 then displays the generated external use panel on the LCD of the operation panel 305 (step S48).

In embodiment 2, since the external use panel is not acquired from the MFP1(10), which is provided with a multi-language display function, the MFP2(30) cannot acquire screen information that has been converted into Chinese. Accordingly, a Japanese external use panel is displayed on the operation panel 305 of the MFP2(30).

<<Other Modifications>>

(1) In embodiments 1 and 2, personal panels can be set for each user. The present invention is not limited, however, in this way. Rather than setting personal panels for each user, personal panels may be set, for example, for each department in a company, or by other types of groups.

(2) In embodiments 1 and 2, it is assumed that user A knows the product name of the MFP2.

The present invention may, however, be provided with a mechanism for acquiring the maximum optional configuration from the personal panel server 20 even when the user does not know the product name of the MFP at the business travel destination.

For example, the personal panel server 20 may be configured to store a table associating IP addresses and product names, so that even when the user does not know the product name of an MFP at the business travel destination, the user can determine the product name of the MFP by inputting the IP address of the MFP. Furthermore, not only an IP address, but also any information specifying the MFP at the business travel destination may be used.

(3) In embodiments 1 and 2, the display language selection screen 140 shown in FIG. 5 was shown as the method for setting the display language of the external use panel. The method of setting the display language, however, is not limited in this way.

For example, the display language of an external use panel may be set to Japanese when the display language of the operation panel 105 during creation of the external use panel is Japanese, and the display language of an external use panel may be set to Chinese when the display language of the operation panel 105 during creation of the external use panel is Chinese.

(4) In embodiments 1 and 2, when creating an external use panel, the user is shown the standard functions and the maximum optional configuration of the MFP2, and the MFP1 accepts selection of items to set from among these functions (see FIG. 4). However, the present invention is not limited in this way.

For example, a configuration may be adopted wherein the functions the user has set for the regular use panel may all be included in the items set for the external use panel, with the user then selecting necessary items only from among the other functions in the maximum optional configuration.

(5) In embodiments 1 and 2, the icons included in the personal panel are also registered in the personal panel server 20. The present invention is not, however, limited in this way. Common icons may be recorded beforehand in each MFP and used to display icons in the regular use panel and to display icons in the external use panel.

(6) In embodiments 1 and 2, the MFP1(10) acquires the maximum optional configuration of the MFP2(30) from the personal panel server 20. The present invention is not, however, limited in this way. The MFP1(10) may acquire the maximum optional configuration from the MFP2(30).

(7) In embodiment 2, the MFP2(30) acquires the setting information for the external use panel directly from the personal panel server 20. Accordingly, the MFP2(30) cannot display the external use panel in Chinese, as the MFP2(30) is not provided with a function to convert to Chinese. The present invention, however, may store screen information for external use panels converted into Chinese in the personal panel server 20, and the MFP2(30) may acquire this screen information from the personal panel server 20 to display an external use panel in Chinese.

(8) In embodiments 1 and 2, the display control unit 113 in the MFP1(10) and the display control unit 312 in the MFP2(30) may gray out shortcut icons.

(9) In embodiments 1 and 2, the MFP1(10) can transition between display of the regular use panel and the external use, panel. This is because the MFP1(10) has acquired both the setting information for the regular use panel and the setting information for the external use panel from the personal panel server.

On the other hand, since the MFP2(30) requests data transmission from the MFP1(10), it is preferable that the amount of data transmitted and received be small. Accordingly, in the above embodiments, the MFP2(30) only acquires the setting information for the external use panel, and therefore cannot transition from display of the external use panel to display of the regular use panel.

The present invention is not, however, limited in this way and may adopt a configuration wherein the MFP2(30) acquires not only the setting information for the external use panel, but also the setting information for the regular use panel, thus being able to transition from display of the external use panel to display of the regular use panel.

(10) In embodiments 1 and 2, the MFP2(30) is not provided with a multi-language display function, but the MFP2(30) may be provided with a multi-language display function. For example, if the MFP2(30) can display screens in Chinese, the MFP1(10) does not need to generate screen information in Chinese from the setting information for the external use panel. In this case, after receiving setting information for the external use panel from the MFP1(10), the MFP2(30) may perform conversion to Chinese.

(11) The present invention may be a method for the MFP1 (10) to create an external use panel. The present invention may also be a method for the personal panel server 20 to administer personal panels (regular use panels and external use panels). Furthermore, the present invention may be a method for the MFP2(30) to acquire and use an external use panel.

The present invention may also be a printer driver to perform these methods via a computer.

The present invention may also be the printer driver or digital signal as recorded on a computer readable recording medium (for example, a flexible disk, hard disk, CD-ROM, MO, DVD, DVD-ROM, DVD-RAM, BD (Blu-ray Disc), semiconductor memory, etc.).

(12) Embodiment 1, embodiment 2, and the above modifications may be combined with one another.

CONCLUSION

The present invention is an image processing system in which an image forming device and a server device are connected via a network, the image forming device comprising: an acquisition unit operable to acquire a maximum optional configuration that indicates all optional functions that can be implemented on another image forming device; a creation unit operable to create an external use screen in accordance with the maximum optional configuration acquired by the acquisition unit, the external use screen being a customized screen for display on an operation panel of the other image forming device; and a transmission unit operable to transmit external setting information corresponding to the external use screen created by the creation unit to the server device, and the server device comprising: a customized screen storage unit that stores the external setting information transmitted by the image forming device.

With this structure, since the image forming device acquires the maximum optional configuration of the other image forming device, it can create an external use screen in accordance with the maximum optional configuration. In other words, even if the MFP at a business travel destination (the "other image forming device") is a different product from the MFP a user regularly uses (the "image forming device") and has different optional functions, the user can create ahead of time a personal panel ("external use screen") that thoroughly takes advantage of the functions on the MFP at the business travel destination.

The server device may further comprise an optional configuration storage unit that stores the maximum optional configuration of the other image forming device, the acquisition unit may acquire the maximum optional configuration from the server device, and the creation unit may include: an accepting subunit that accepts, from a user, one or more functions to display on the external use screen from among optional functions included in (i) standard functions implemented on the other image forming device and (ii) the maximum optional configuration acquired by the acquisition unit; and a creation subunit that creates the external use screen so as to include operation keys in one-to-one correspondence with the functions accepted by the accepting subunit.

With this structure, since the server device manages the maximum optional configuration of the other image forming device, the image forming device can acquire the maximum optional configuration from the server device, thus allowing the user to create an external use screen with functions not implemented on the image forming device.

The customized screen storage unit may store regular setting information, which is for a regular use screen, and the external setting information in association with each other, the regular use screen being a customized screen for display on an operation panel of the image forming device and including a transition key to transition to the external use screen, the acquisition unit may acquire the regular setting information and the external setting information from the server device, and the image forming device may further comprise a display control unit operable to switch display from the regular use screen to the external use screen when the user selects the transition key while the regular use screen is being displayed on the operation panel.

With this structure, the image forming device can easily transition the display of the operation panel from the regular use screen to the external use screen, thereby improving operability and visibility and allowing the user to rapidly confirm and update each screen.

The image forming device may have a multi-language display function whereby a display language of each screen displayed on the operation panel can be chosen from among a plurality of languages, the creation unit may include a language setting subunit that sets the display language of the external use screen to one of the languages available via the multi-language display function, the transmission unit may transmit the display language set by the language setting subunit to the server device in association with the external setting information, and the customized screen storage unit may store the external setting information and the display language in association with each other.

With this structure, when the image forming device has a multi-language display function, then it is possible, for example, to set each external use screen to a different display language, thereby making the image processing system more convenient for users.

The server device may further comprise a restricted use management unit operable to manage restricted use information, the restricted use information indicating functions which the user is restricted from using from among functions implemented on the other image forming device.

With this structure, the image forming device and other image forming device can acquire the restricted use information from the server device in order to show the user a regular use screen and an external use screen that reflect the restricted use information.

The other image forming device may comprise: a remote access unit operable to acquire the external setting information from the image forming device; and a display control unit operable to generate the external use screen in accordance with the external setting information acquired by the remote access unit and display the external use screen thus generated on the operation panel, and the image forming device may further comprise: an accepting unit operable to accept a request for the external setting information from the other image forming device; and a transfer unit operable, upon acceptance of the request by the accepting unit, to acquire the external setting information from the server device and transfer the external setting information thus acquired to the other image forming device.

With this structure, the other image forming device can display an external use panel created in accordance with the maximum optional configuration of the other image forming device, thus allowing the user maximum use of the functions on an image forming device at a business travel destination.

Furthermore, since the other image forming device remotely accesses the image forming device, which is connected to the server device via a network, and requests that the image forming device transfer the external setting information, the other image forming device can acquire the external setting information via the image forming device even when the other image forming device cannot directly access the server device.

The display control unit in the other image forming device may change a display of an unusable operation key to a non-selectable display, the unusable operation key being an operation key, among the operation keys included in the external use screen, that corresponds to an unusable function.

The unusable function may be a function not implemented on the other image forming device.

The unusable function may be a function the user is restricted from using as indicated by the restricted use information, which the other image forming device acquires from the server device.

Normally, when a user selects an unusable function, an error message is displayed on the operation panel. With this structure, however, unusable functions are non-selectable, and therefore no error message is displayed on the operation panel. The user can therefore continue to operate the panel without feeling annoyed.

The transfer unit may further acquire the display language associated with the external setting information from the server device, the display control unit in the image forming device may include: a first generation subunit that generates the external use screen in accordance with the external setting information acquired from the server device; and a second generation subunit that generates screen information by using the multi-language display function to convert the external use screen generated by the first generation subunit into the display language, upon generation of the screen information by the second generation subunit, the transfer unit may transfer the screen information to the other image forming device instead of transferring the external setting information, and the display control unit in the other image forming device may display the screen information acquired from the transfer unit on the operation panel instead of generating the external use screen in accordance with the external setting information.

Conventionally, if a user wanted to display a personal panel in Chinese on an MFP at a business travel destination, Chinese language data would have to be installed on the MFP at the business travel destination. Typically, however, programs and language data are installed by service personnel, thus making it difficult for a user to enable a personal panel in Chinese to be used before departing on a business trip.

By adopting the above-described structure, an external use panel can be displayed in the set display language even if the other image forming device does not have a multi-language display function, or even if the other image forming device has a multi-language display function, but the conversion program for the corresponding display language or the language data have not been installed.

The other image forming device may comprise: an acquisition unit operable to acquire the external setting information from the server device; and a display control unit operable to display the external use screen on an operation panel in accordance with the external setting information acquired by the acquisition unit.

With this structure, the other image forming device can display an external use panel created in accordance with the maximum optional configuration of the other image forming device, thus allowing the user maximum use of the functions on an image forming device at a business travel destination.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing system including a first image forming device, a second image forming device, and a server device,
the first image forming device comprising:
an acquisition unit operable to acquire a maximum optional configuration that indicates all optional functions that can be implemented on the second image forming device regardless of whether or not the second image forming device is actually provided with each of the optional functions;
a first creation unit operable to create an external use screen in accordance with the maximum optional configuration acquired by the acquisition unit, the external use screen being a customized screen for display on an operation panel of the second image forming device; and
a transmission unit operable to transmit external setting information corresponding to the external use screen created by the creation unit to the server device, and
the server device comprising:
a customized screen storage unit that stores the external setting information transmitted by the first image forming device.

2. The image processing system of claim 1, wherein
the server device further comprises an optional configuration storage unit that stores the maximum optional configuration of the second image forming device,
the acquisition unit acquires the maximum optional configuration from the server device, and
the first creation unit includes:
an accepting subunit that accepts, from a user, one or more functions to display on the external use screen from among optional functions included in (i) standard functions implemented on the second image forming device and (ii) the maximum optional configuration acquired by the acquisition unit; and
a creation subunit that creates the external use screen so as to include operation keys in one-to-one correspondence with the functions accepted by the accepting subunit.

3. The image processing system of claim 1, wherein
the customized screen storage unit stores regular setting information, which is for a regular use screen, and the external setting information in association with each other, the regular use screen being a customized screen for display on an operation panel of the first image forming device and including a transition key to transition to the external use screen,
the acquisition unit acquires the regular setting information and the external setting information from the server device, and
the first image forming device further comprises a display control unit operable to switch display from the regular use screen to the external use screen when the user selects the transition key while the regular use screen is being displayed on the operation panel.

4. The image processing system of claim 1, wherein
the first image forming device has a multi-language display function whereby a display language of each screen displayed on the operation panel can be chosen from among a plurality of languages,
the first creation unit includes a language setting subunit that sets the display language of the external use screen to one of the languages available via the multi-language display function,
the transmission unit transmits the display language set by the language setting subunit to the server device in association with the external setting information, and
the customized screen storage unit stores the external setting information and the display language in association with each other.

5. The image processing system of claim 1, wherein
the server device further comprises a restricted use management unit operable to manage restricted use information, the restricted use information indicating functions which the user is restricted from using from among functions implemented on the second ether image forming device.

6. The image processing system of claim 1, wherein
the second image forming device comprises:
a remote access unit operable to acquire the external setting information from the image forming device; and
a display control unit operable to generate the external use screen in accordance with the external setting information acquired by the remote access unit and display the external use screen thus generated on the operation panel, and
the first image forming device further comprises:
an accepting unit operable to accept a request for the external setting information from the other image forming device; and
a transfer unit operable, upon acceptance of the request by the accepting unit, to acquire the external setting information from the server device and transfer the external setting information thus acquired to the second image forming device.

7. The image processing system of claim 6, wherein the display control unit in the second image forming device changes a display of an unusable operation key to a non-selectable display, the unusable operation key being an operation key, among the operation keys included in the external use screen, that corresponds to an unusable function.

8. The image processing system of claim 7, wherein the unusable function is a function not implemented on the second image forming device.

9. The image processing system of claim 7, wherein the unusable function is a function the user is restricted from using as indicated by restricted use information, which the second image forming device acquires from the server device.

10. The image processing system of claim 7, wherein the transfer unit further acquires the display language associated with the external setting information from the server device,
the display control unit in the image forming device includes:
a first generation subunit that generates the external use screen in accordance with the external setting information acquired from the server device; and
a second generation subunit that generates screen information by using the multi-language display function to convert the external use screen generated by the first generation subunit into the display language,
upon generation of the screen information by the second generation subunit, the transfer unit transfers the screen information to the second image forming device instead of transferring the external setting information, and
the display control unit in the other image forming device displays the screen information acquired from the transfer unit on the operation panel instead of generating the external use screen in accordance with the external setting information.

11. The image processing system of claim 1, wherein the second image forming device comprises:
an acquisition unit operable to acquire the external setting information from the server device; and
a display control unit operable to display the external use screen on an operation panel in accordance with the external setting information acquired by the acquisition unit.

12. The image processing system of claim 1, wherein the maximum optional configuration is acquired by each model of the second ether image forming device by the acquisition unit.

13. The image processing system of claim 1, wherein the first image forming device further comprises
a second creation unit operable to create a regular use screen in accordance with an optional function implemented on the first image forming device, the regular use screen being a customized screen for display on an operation panel of the first image forming device.

14. A server device that can connect to a first image forming device via a network, the server device comprising:
an optional configuration storage unit that stores a maximum optional configuration indicating all optional functions that can be implemented on a second image forming device, which differs from the first image forming device, regardless of whether or not the second image forming device is actually provided with each of the optional functions;
a first transmission unit operable to accept a request from the first image forming device and transmit the maximum optional configuration to the first image forming device;
a receiving unit operable to receive setting information corresponding to an external use screen, which is a customized screen for display on an operation panel of the second image forming device;
a customized screen storage unit that stores the setting information received by the receiving unit; and
a second transmission unit operable to transmit the setting information to the first image forming device or to the second image forming device.

15. The server device of claim 14, wherein the optional configuration storage unit associates a plurality of models of the second image forming devices with a plurality of the maximum optional configurations and stores therein each associated the model of the second image forming device and the maximum optional configuration.

16. An image forming device comprising:
an acquisition unit operable to acquire a maximum optional configuration that indicates all optional functions that can be implemented on a second image forming device, which differs from the image forming device, regardless of whether or not the second image forming device is actually provided with each of the optional functions;
a first creation unit operable to create an external use screen in accordance with the maximum optional configuration acquired by the acquisition unit, the external use screen being a customized screen for display on an operation panel of the second image forming device; and
a transmission unit operable to transmit setting information corresponding to the external use screen created by the first creation unit to the server device.

17. The image forming device of claim 16 further comprises:
an accepting unit operable to accept a request for the external setting information from a remote accessing unit of the second image forming device; and
a transfer unit operable, upon acceptance of the request by the accepting unit, to acquire the external setting information from the server device and transfer the external setting information thus acquired to the second image forming device.

18. The image forming device of claim 16, wherein the image forming device further comprises
a second creation unit operable to create a regular use screen in accordance with an optional function implemented on the image forming device, the regular use screen being a customized screen for display on an operation panel of the image forming device.

19. A non-transitory computer readable recording medium on which is recorded a computer program executable on a server device that can connect to a first image forming device via a network, the computer program causing a computer of the server device to execute steps of:
accepting a request from the image forming device, reading from a storage unit a maximum optional configuration indicating all optional functions that can be implemented on a second image forming device, which differs from the first image forming device, regardless of whether or not the second image forming device is actually provided with each of the optional functions, and transmitting the maximum optional configuration to the image forming device;

receiving, from the first image forming device, setting information corresponding to an external use screen, which is a customized screen for display on an operation panel of the second image forming device;

storing the setting information, received in the receiving step, in the storage unit of the server device; and transmitting the setting information to the first image forming device or to the second image forming device.

20. A non-transitory computer readable recording medium on which is recorded a computer program executable on a first image forming device that can connect to a server device via a network, the computer program causing a computer of the image forming device to execute steps of:

acquiring from the server a maximum optional configuration that indicates all optional functions that can be implemented on a second image forming device, which differs from the first image forming device, regardless of whether or not the second image forming device is actually provided with each of the optional functions;

creating an external use screen in accordance with the maximum optional configuration acquired in the acquisition step, the external use screen being a customized screen for display on an operation panel of the second image forming device; and transmitting setting information that corresponds to the external use screen created in the creation step to the server device.

21. The non-transitory computer readable recording medium of claim 20, wherein the first image forming device further comprises a second creation unit operable to create a regular use screen in accordance with an optional function implemented on the first image forming device, the regular use screen being a customized screen for display on an operation panel of the first image forming device.

* * * * *